Oct. 12, 1943.  J. H. RAND, JR., ET AL  2,331,501
SHEARING HEAD
Filed June 30, 1939  2 Sheets-Sheet 1
FIG. 1
FIG. 2
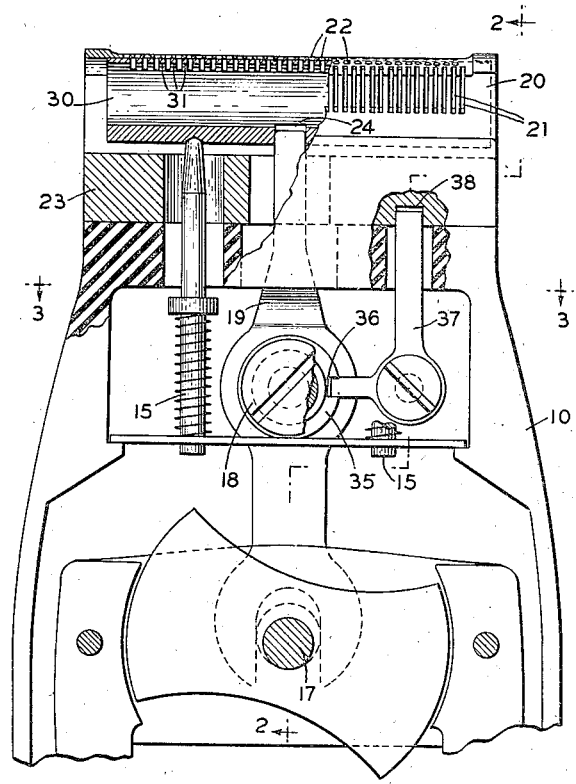
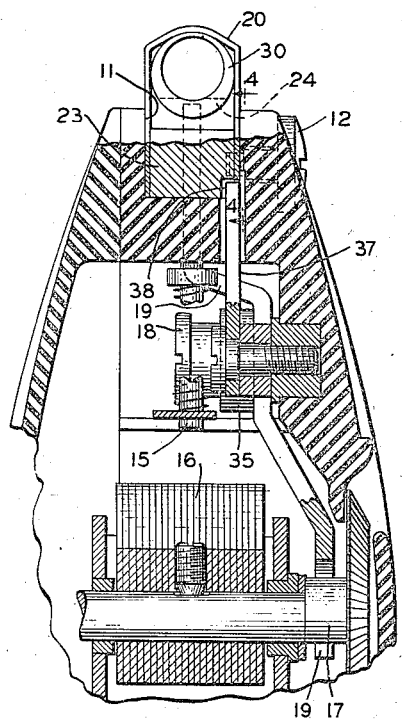
FIG. 3
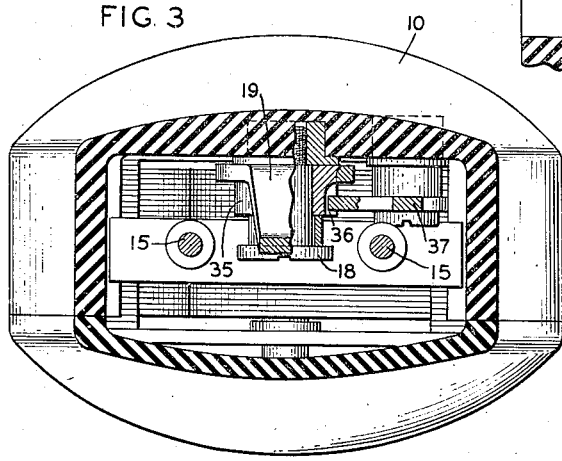
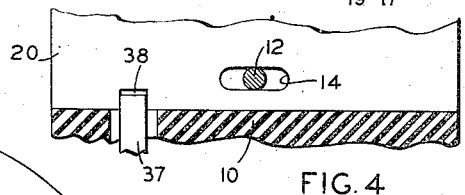
FIG. 4
INVENTORS
J. H. RAND, JR.
A. M. ROSS
BY *W. A. Sparks.*
ATTORNEY Oct. 12, 1943.  J. H. RAND, JR., ET AL  2,331,501
SHEARING HEAD
Filed June 30, 1939   2 Sheets-Sheet 2

INVENTORS
J. H. RAND, JR.
A. M. ROSS
BY
ATTORNEY

Patented Oct. 12, 1943

2,331,501

UNITED STATES PATENT OFFICE 2,331,501

SHEARING HEAD

James H. Rand, Jr., Stamford, and Albert M. Ross, Greenwich, Conn., assignors to Remington Rand Inc., Buffalo, N. Y., a corporation of Delaware Application June 30, 1939, Serial No. 282,004

6 Claims. (Cl. 30—43)

The invention relates to shearing heads for mechanical razors and more particularly to mechanism for positively driving the members of the shearing head.

In mechanical razors it has been the practice to secure the outer shear plate stationary while the inner cutter is reciprocated with respect thereto. It has been found, however, that a more efficient shearing action is obtained when the shear plate is reciprocated a slight amount in an opposite direction to that of the inner cutter.

It is the principal object of the invention to provide a driving mechanism for the outer shear plate as well as the inner cutter.

Another object is to provide a driving member for the shear plate which has a shorter amplitude of reciprocation than the driving means for the inner cutter.

A further object is to provide a positive driving means which reciprocates the shear plate in a direction opposite to that of the inner cutter.

A more clear conception of the operation, construction, and further objects of the invention may be had from the following specification when taken in conjunction with the accompanying drawings in which Fig. 1 discloses a mechanical razor using a cam and lever driving mechanism;

Fig. 2 is a vertical cross section taken along line 2—2 of Fig. 1 showing the arrangement of parts;

Fig. 3 is a cross section taken along line 3—3 of Fig. 1 disclosing the cam drive for the outer shear plate;

Fig. 4 is a vertical cross section taken along line 4—4 of Fig. 2 showing the method of securing the shearing head in the handle;

Figure 5:
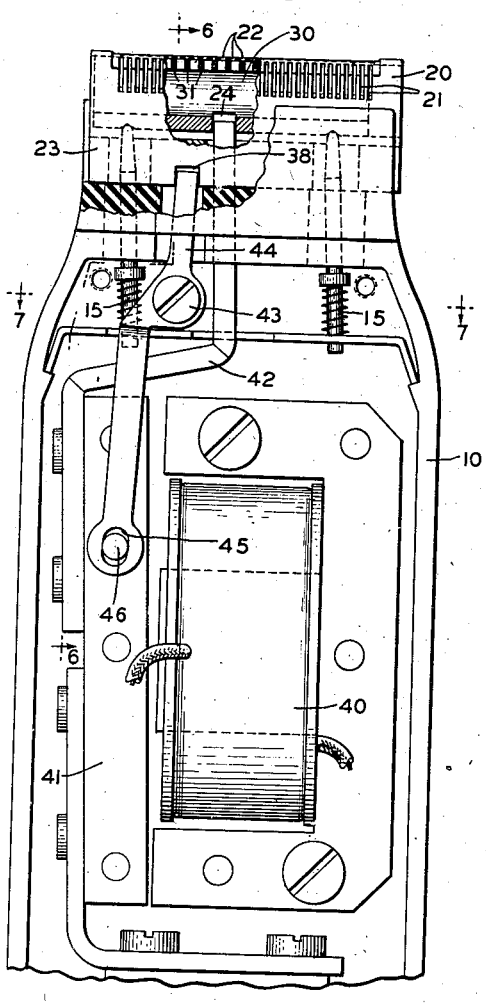
Figure 6:
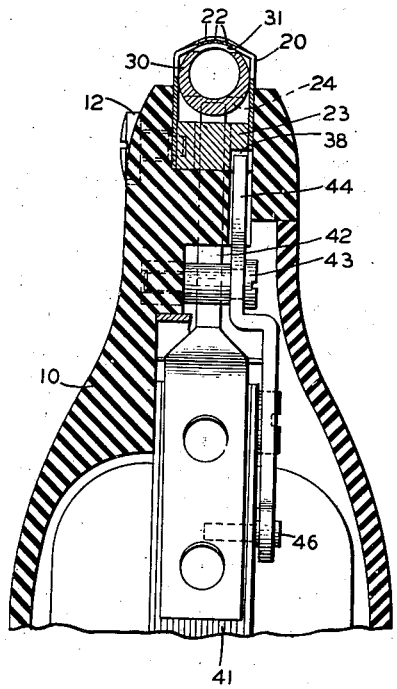
Figure 7:
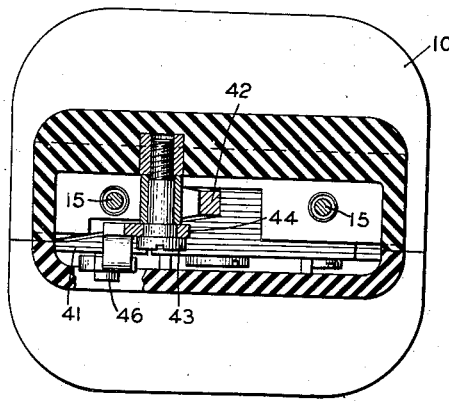

Fig. 5 discloses a form of drive for use with the electric vibrator type of motor; portions of the handle, outer shear plate and inner cutter being cut away for clearness;

Fig. 6 is a vertical cross section taken along line 6—6 of Fig. 5;

Fig. 7 is a cross section taken along line 7—7 of Fig. 5 disclosing the mounting for the driving members.

All of the razors illustrated are of a well known type in which a motor or vibrator are mounted in a handle 10, the top of which is provided with a U-shaped groove 11 in which the shearing head is secured by a screw 12. Heretofore this screw has engaged an indentation which was adapted to hold the outer shear plate from any movement with respect to the handle. In view of the fact that it is the main object of this invention to reciprocate the shear plate with respect to the handle the indentation above referred to has been altered to a slot 14 (Fig. 4) and the screw 12 has been shouldered to insure that the shearing head is held from vertical displacement while being free for lateral movement.

All of the razors shown are provided with well known spring-pressed pins 15 which pass through the base of the shear plate and force the inner cutter into shearing engagement with the shear plate.

The shearing head shown herein comprises a shear plate 20 and an inner cutter 30. The shear plate comprises a piece of sheet metal having slots 21 and perforations 22 therein which is secured to a base member 23. The inner cutter 30 is tubular, having an eccentric bore, with slots 31 cut in the reduced portion of the tube. The slots 21 and 31 and the perforations 22 form shearing edges as is well known. The base is provided with indentations which are engaged by the pins 15.

The razor in Figs. 1-3, inclusive, has an electric motor in the handle 11, the rotor 16 of which is secured to and drives a horizontal cam shaft 17. Pivotally mounted on a shouldered screw 18 secured in the casing is a drive arm 19 having a forked end adapted to engage the cam shaft 17 and be oscillated thereby. The arm 19 is adapted to engage a slot 24 in the lower portion of the inner cutter 30 and thereby reciprocate the inner cutter. Up to this point the razor is the same as many well known razors, except for the slidable mounting of shear plate 20 as above described.

Secured to the arm 19 is a bushing 35 having a slot 36 therein. Pivotally mounted on the casing 10 is an L-shaped bell-crank 37, the horizontal arm of which acts in the slot 36 and the vertical arm of which is engaged in a slot 38 in the base 23 of the shear plate 20.

When the driving arm 19 is oscillated in a clockwise direction (Fig. 1) about its pivot 18 the bushing 35 through the medium of slot 36 rocks the bell-crank 37 in a counter-clockwise direction. The movement of these two members in opposite directions causes the shear plate to be moved to the left and the inner cutter to be moved to the right. Due to the difference in length of the arms 19 and 37 and their driving medium the shear plate is reciprocated a very much smaller amount than the inner cutter.

In Figs. 5, 6, and 7 is disclosed a razor having a vibrating means for driving the cutters. An electromagnet 40 and its associated armature 41 are secured to the handle or casing 10 in any well known manner. Secured to the armature 41 is a driving arm 42 the end of which engages in a slot 24 in the base of the inner cutter 30.

Pivotally mounted on a screw 43 secured in the casing 10 is a lever 44, the depending arm of which has a slot 45 therein which is adapted to cooperate with a pin 46 on the armature 41. The upper end of the lever 44 cooperates with a slot 38 in the base of the shear plate.

When current is applied to the magnet 40 the armature 41 is attracted moving the arm 42 to the right, thereby moving the inner cutter. Upon removal of current or change in polarity the armature will be released carrying arm 42 and inner cutter 30 to the left.

Due to the fact that the arm 43 is pivotally mounted on the casing any movement of the armature to the right will cause the arm 43 to be rotated counter-clockwise thus moving the shear plate 20 to the left. A movement to the left of armature 41 will result in a movement to the right of the shear plate. It is thus obvious that the shear plate and inner cutter are reciprocated in opposite directions and due to the difference in length of the driving arms 42 and 44, do so at a different degree of amplitude.

From the above it is seen that the various driving mechanisms shown will reciprocate the shear plate in one direction a small amount and the inner cutter in the opposite direction a greater amount. This movement has been found after extensive tests to provide a cleaner, more efficient method of cutting hair, due to the sifting or combing action of the moving shear plate, and a more efficient shearing action due to the fact that both cutters are in motion.

Several advantages are obtained by slidably mounting the outer cutter on the casing for reciprocating movement relative to the casing and the inner cutter in the operation of the shaver. The inner cutter can be made to cooperate with a greater number of cutter bars when the outer cutter is reciprocated in a direction opposite to the inner cutter so as to secure more rapid cutting and an increased number of cutting operations as compared with a shaver where the outer cutter is stationary. This is obtained without increasing the distance that the inner cutter is reciprocated.

In addition, the reciprocation of the outer cutter provides a vibratory movement that aids in massaging the skin during the shaving operation, as well as aiding in obtaining more efficient shaving through having the outer cutter reciprocate over the skin back and forth while it is moved in a direction laterally of the direction of reciprocation. This obtains the positioning of the cutter bars on the outer cutter in many different positions relative to the cutting action of the inner cutter bars herewith so that a more efficient shaving operation is obtained by having the outer cutter pick up the hair for guiding it through the apertures therein for cutting by the inner cutter, a condition that can not be obtained by a stationary outer cutter. Operation of the cutters in opposite direction is advantageous in obtaining balanced operation of the shaver while the resilient means for projecting the inner cutter into cutting cooperation with the outer cutter also operates to hold the outer cutter in one relative sliding position with the inner cutter during the shaving operation.

What we claim as new, and desire to secure by Letters Patent, is:

1. In a mechanical razor a shearing head comprising an outer shear plate, and an inner cutter reciprocally mounted therein, a casing, said shearing head being mounted for lateral movement within said casing, an electro-magnet having an armature, a driving arm for said inner cutter secured to said armature, and a pivotally mounted drive arm for said shear plate adapted to be actuated by said armature, said arms having a different effective length for reciprocating said plate and cutter in opposite directions at different degrees of amplitude.

2. In a mechanical razor a shearing head comprising an outer shear plate, and an inner cutter reciprocally mounted therein, a casing, said shearing head being mounted for lateral movement within said casing, a drive shaft having a cam thereon, an individual driving arm for said cutter actuated by said cam, a lever for driving said shear plate and a cam on said driving arm for rocking said lever, said arm and lever being formed for cooperation to reciprocate said plate and cutter in opposite directions at different degrees of amplitude.

3. In a mechanical razor a shearing head comprising an outer shear plate, and an inner cutter reciprocally mounted therein, a casing, said shearing head being mounted for lateral movement within said casing, an electro-magnet having an armature, a driving arm for said inner cutter secured to said armature, and a second drive arm for said shear plate pivotally mounted on said casing and connected with said driving arm for operation by said armature, said arms being formed for cooperation to reciprocate said plate and cutter in opposite directions at different degrees of amplitude.

4. A shaver comprising a casing, an outer shear plate, cooperating means formed on the shear plate and casing slidably mounting the shear plate on one end of the casing, said shear plate being formed with a longitudinal bore, an inner cutter housed in said bore and reciprocable therein, resilient means normally engaging and retaining said inner cutter in cutting cooperation with said outer shear plate and said shear plate in one relative sliding position on said casing, a motor in said casing, a pair of levers pivotally mounted in said casing, one of said levers having a portion engaging said shear plate and the other lever having a portion engaging said inner cutter, one of said levers being connected for movement on its pivot by said motor, and the other of said levers having a driving connection with the first-mentioned lever for simultaneous movement on its pivot when said motor is operated for cooperation to reciprocate said shear plate and inner cutter relative to each other and said casing for cutting cooperation.

5. A shaver comprising a casing, an outer shear plate, cooperating means formed on the shear plate and casing slidably mounting the shear plate on one end of the casing, said shear plate being formed with a longitudinal bore, an inner cutter housed in said bore and reciprocable therein, resilient means normally engaging and retaining said inner cutter in cutting cooperation with said outer shear plate and said shear plate in one relative sliding position on said casing, a motor in said casing, a pair of levers pivotally mounted on spaced parallel pivots in said casing, one of said levers engaging said shear plate and the other lever engaging said inner cutter, one of said levers having an operating connection with said motor for pivotal movement thereby in the operation of the motor, and an arm on one of said levers having the end portion interengaged with complementary parts on the other of said levers to provide a driving connection therebetween for driving said levers in opposite directions in the movement of the first mentioned lever when said motor is operated for cooperation to reciprocate said shear plate and inner cutter in opposite directions relative to each other and said casing for cutting cooperation.

6. In a shaver having a casing slidably mounting an outer shear plate member, a movable cutter member slidably mounted on said shear plate member and an operating motor for said shaver, the combination of a lever pivoted intermediate its ends on said casing with one end engaging one of said members and the opposite end engaging said motor for operation thereby, and another lever pivoted on said casing in spaced relation to said first-mentioned lever and having one arm engaging the other of said members and another arm engaged with the first-mentioned lever for operation thereby to secure movement of both members relative to each other and said casing in the operation of said motor.

JAMES H. RAND, Jr.
ALBERT M. ROSS.